United States Patent
Asur et al.

(10) Patent No.: US 10,997,250 B2
(45) Date of Patent: May 4, 2021

(54) ROUTING OF CASES USING UNSTRUCTURED INPUT AND NATURAL LANGUAGE PROCESSING

(71) Applicant: salesforce.com, inc., San Francisco, CA (US)

(72) Inventors: Sitaram Asur, San Francisco, CA (US); Aditya Sakhuja, San Francisco, CA (US); Hui S. Fisher, Bellevue, WA (US); Anjan Goswami, San Francisco, CA (US); Khoa Le, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 114 days.

(21) Appl. No.: 16/140,418

(22) Filed: Sep. 24, 2018

(65) Prior Publication Data

US 2020/0097616 A1 Mar. 26, 2020

(51) Int. Cl.
*G06F 16/9032* (2019.01)
*G06F 9/451* (2018.01)
(Continued)

(52) U.S. Cl.
CPC ........ *G06F 16/90332* (2019.01); *G06F 9/453* (2018.02); *G06F 40/295* (2020.01); *G06F 40/30* (2020.01)

(58) Field of Classification Search
None
See application file for complete search history.

(56) References Cited

U.S. PATENT DOCUMENTS 6,064,978 A * 5/2000 Gardner ................ G06Q 30/02
434/322
7,730,478 B2 6/2010 Weissman
(Continued)

FOREIGN PATENT DOCUMENTS

JP 2014085862 A 5/2014
JP 5952756 B2 9/2014
(Continued)

OTHER PUBLICATIONS

Faisal M, Daud A, Akram A. Expert Ranking using Reputation and Answer Quality of Co-existing Users. International Arab Journal of Information Technology (IAJIT). Jan. 1, 2017;14(1). (Year: 2017).*

*Primary Examiner* — Jonathan C Kim
(74) *Attorney, Agent, or Firm* — Haynes and Boone, LLP

(57) ABSTRACT

A method is provided for generating a ranked list of candidate responders. In some embodiments, the method includes receiving a question from a user and generating a question feature vector representing an intent of the question and a first skill set inferred from the question. The method also includes for one or more candidate responders, generating a candidate feature vector representing a skill set and questions associated with the respective candidate responder; computing a reputation score based on questions and user feedback associated with the respective candidate responder; and computing, based on the question feature vector, candidate feature vector, and reputation score, a probability score representing a prediction of the quality of an answer that would be provided by the respective candidate responder if the input question were routed to the respective candidate responder. The method further includes generating a ranked list of candidate responders using the computed probability scores.

20 Claims, 10 Drawing Sheets

(51) Int. Cl.
  *G06F 40/30* (2020.01)
  *G06F 40/295* (2020.01)

(56) References Cited

U.S. PATENT DOCUMENTS

| | | | |
|---|---|---|---|
| 7,779,039 B2 | 8/2010 | Weissman et al. | |
| 8,458,213 B2 | 6/2013 | Edmonds et al. | |
| 8,675,957 B2 | 3/2014 | Goswami et al. | |
| 8,793,120 B1 | 7/2014 | Fliedner et al. | |
| 8,793,258 B2 | 7/2014 | Asur et al. | |
| 8,977,629 B2 | 3/2015 | Goswami et al. | |
| 9,176,969 B2 | 11/2015 | Asur et al. | |
| 9,519,918 B2 | 12/2016 | Goswami et al. | |
| 10,049,380 B2 | 8/2018 | Asur et al. | |
| 10,176,429 B2 | 1/2019 | Goswami et al. | |
| 10,412,153 B2* | 9/2019 | Olive | H04L 67/10 |
| 10,430,517 B1* | 10/2019 | Mulwad | G06F 9/453 |
| 2004/0249867 A1* | 12/2004 | Kraiss | G06F 9/44536 |
| 2004/0250255 A1* | 12/2004 | Kraiss | G06F 16/258 719/310 |
| 2008/0046520 A1* | 2/2008 | Jager | G06Q 10/107 709/206 |
| 2008/0235005 A1* | 9/2008 | Golan | G06Q 10/10 704/9 |
| 2009/0049042 A1* | 2/2009 | An | G06Q 30/02 |
| 2009/0162824 A1* | 6/2009 | Heck | G06N 3/004 434/322 |
| 2010/0070554 A1* | 3/2010 | Richardson | G06Q 10/06 709/202 |
| 2010/0106668 A1* | 4/2010 | Hawthorne | G06Q 10/10 706/11 |
| 2011/0106746 A1* | 5/2011 | Ventilla | H04L 12/66 706/50 |
| 2011/0258256 A1 | 10/2011 | Huberman et al. | |
| 2012/0128239 A1 | 5/2012 | Goswami et al. | |
| 2012/0221557 A1 | 8/2012 | Edmonds et al. | |
| 2012/0259918 A1* | 10/2012 | Bringer | G06F 9/542 709/204 |
| 2012/0303615 A1 | 11/2012 | Goswami et al. | |
| 2013/0311563 A1 | 11/2013 | Huberman et al. | |
| 2014/0040277 A1 | 2/2014 | Asur et al. | |
| 2014/0214467 A1 | 7/2014 | Asur et al. | |
| 2014/0270145 A1* | 9/2014 | Erhart | H04M 3/5166 379/265.13 |
| 2015/0006241 A1 | 1/2015 | Jamal et al. | |
| 2015/0066904 A1 | 3/2015 | Asur et al. | |
| 2015/0199631 A1 | 7/2015 | Ankolekar et al. | |
| 2016/0034260 A1* | 2/2016 | Ristock | G06F 9/453 717/109 |
| 2016/0063122 A1 | 3/2016 | Asur et al. | |
| 2016/0078472 A1 | 3/2016 | Asur et al. | |
| 2016/0154822 A1 | 6/2016 | Goswami et al. | |
| 2016/0241499 A1 | 8/2016 | Hailpern et al. | |
| 2017/0193573 A1 | 7/2017 | Han et al. | |
| 2018/0060395 A1* | 3/2018 | Pathak | G06F 16/2471 |
| 2018/0211260 A1* | 7/2018 | Zhang | G06Q 30/016 |
| 2018/0276005 A1* | 9/2018 | James | G06Q 10/06316 |
| 2019/0042988 A1* | 2/2019 | Brown | G06Q 10/0631 |
| 2019/0050239 A1* | 2/2019 | Caldwell | G06F 11/079 |
| 2019/0065259 A1* | 2/2019 | Venkata Naga Ravi | G06F 9/5005 |
| 2019/0095844 A1* | 3/2019 | Dunne | H04L 51/046 |
| 2019/0138660 A1 | 5/2019 | White et al. | |
| 2019/0235998 A1 | 8/2019 | Fisher et al. | |
| 2019/0310888 A1* | 10/2019 | Lessin | G06F 9/505 |
| 2019/0317819 A1* | 10/2019 | Brown | G06F 9/4843 |
| 2019/0324779 A1* | 10/2019 | Martin | G06F 3/0481 |
| 2019/0325081 A1* | 10/2019 | Liu | G06F 3/011 |
| 2019/0356562 A1* | 11/2019 | Watkins | G06F 9/547 |

FOREIGN PATENT DOCUMENTS

| WO | WO2016186634 A1 | 11/2016 |
|---|---|---|
| WO | WO2017023359 A1 | 2/2017 |

* cited by examiner

LiveAgent Transcript

Chat Started: Wednesday, April 12, 2017, 16:14:24 (-0700)
Agent Jennifer S ( 1m 53s )

User: I bought a new phone yesterday, but did not have time to activate it in the store. Can you help me? ( 2m 04s )

Jennifer S: Thanks for patience! I am part of the "Shop and Support" team and would be happy to help you! Can you please provide me with your phone number ( 1m 21s )

ROUTING OF CASES USING UNSTRUCTURED INPUT AND NATURAL LANGUAGE PROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to computing device, and more specifically to systems and methods for routing cases using unstructured input.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

BRIEF DESCRIPTION OF THE DRAWINGS

FIG. 6 illustrates an example LiveAgent transcript associated with the case discussed in FIG. 5.

Figure 1:
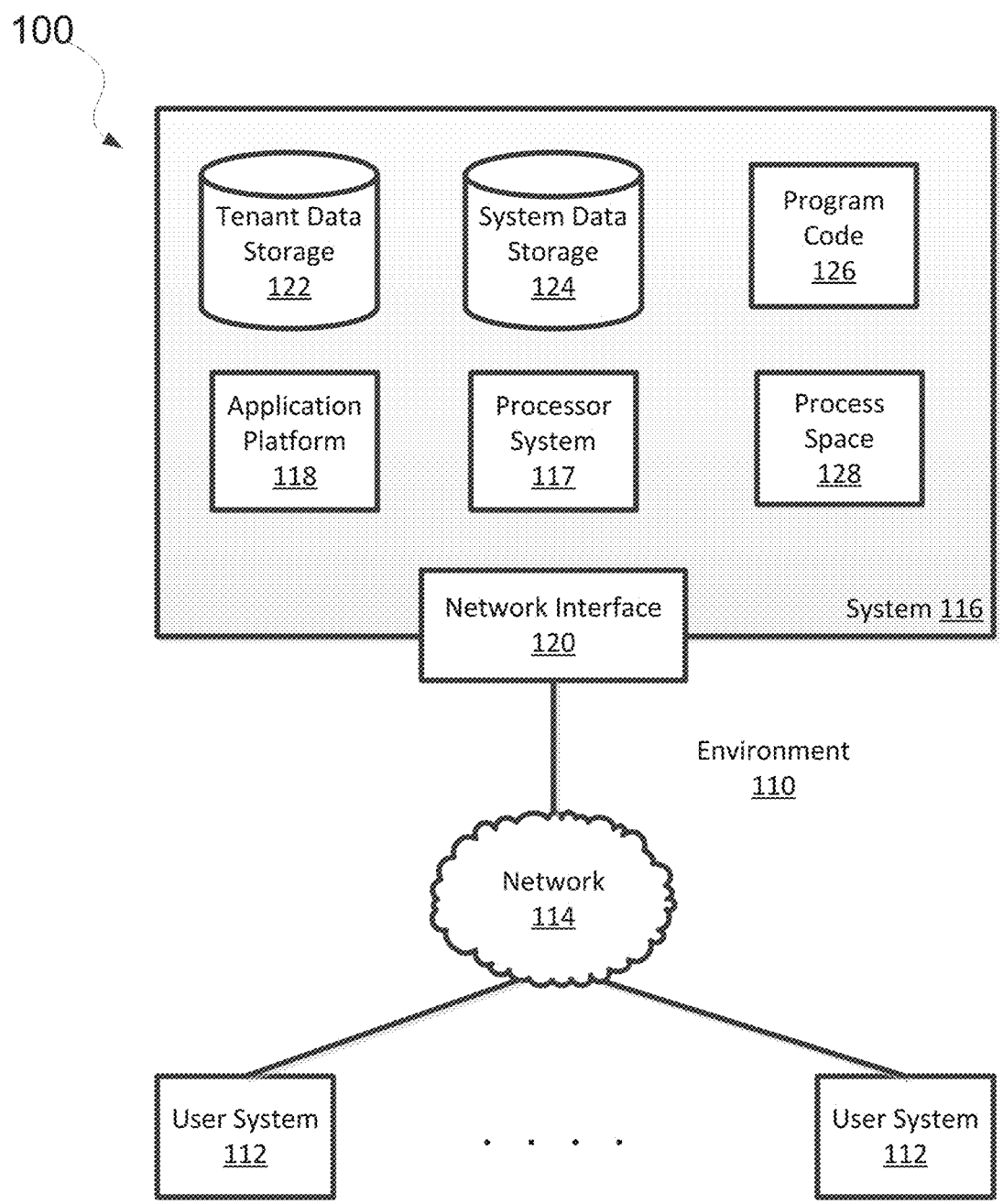
FIG. 1 illustrates a block diagram of an example environment according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Example Environment

The system and methods of the present disclosure can include, incorporate, or operate in conjunction with or in the environment of a database, which in some embodiments can implemented as a multi-tenant, cloud-based architecture.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational database management system (RDBMS) or the equivalent may execute storage and retrieval of information against the database object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, personal digital assistant (PDA), cellphone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit (CPU) such as an Intel Pentium® processor or the like. Similarly, system 116 (and additional instances of an MTS, where more than one is present) and all of their components might be operator configurable using application(s) including computer code to run using a CPU such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
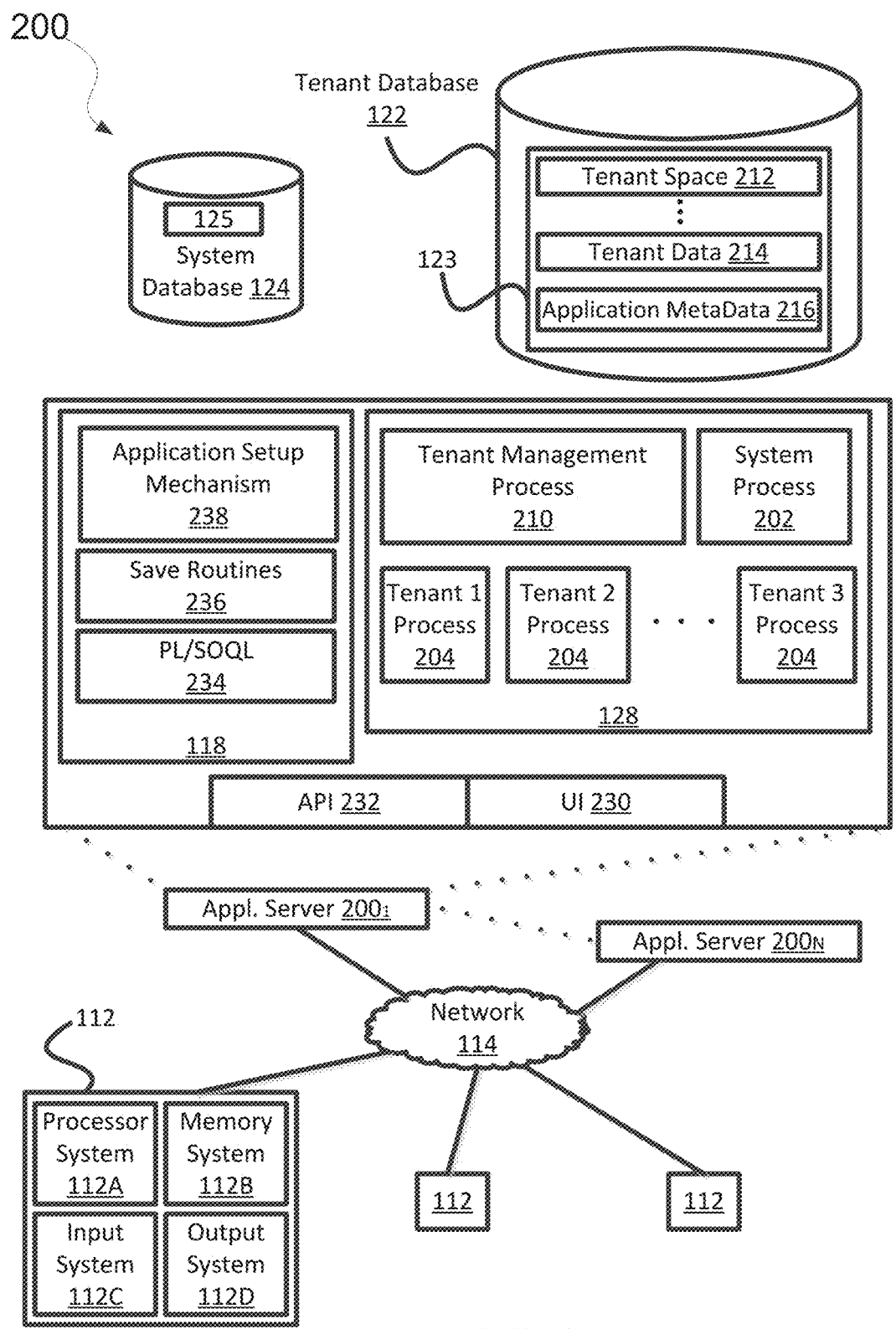
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed September, 2007, entitled "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. TCP/IP are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a CRM system, for example, these categories or groupings can include various standard entities, such as account, contact, lead, opportunity, group, case, knowledge article, etc., each containing pre-defined fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Selection of Candidate Responders

Various users interacting with a system, such as a customer relationship management (CRM) system, may have questions for which they need help or a response. A CRM system, such as the multi-tenant database system 116 described above, may collect data about customers such as a user's personal information (e.g., name, phone number, title, email address, etc.), the date of last contact and what was discussed, recent website visits or brand engagements, order information, among other information. The data stored in a CRM system may be leveraged to assist in determining a set of candidate responders who may be best suited for answering a question posed by a user. A user may refer to an entity asking the question. A candidate responder may refer to an entity who is a candidate for answering the question. A responder may refer to an entity who answered the question. In some contexts, the term "user," "candidate responder," and/or "responder," may be used interchangeably, and the term "case" and "question" may also be used interchangeably. It should be understood that in the present disclosure, a comment, post, or conversation provided by or participated in by a responder may also be referred to as an answer to the question. Additionally, a candidate responder may refer to an agent waiting to respond to a user's question (e.g., in livechat) or to an expert who has registered with the system and/or answered previous questions (e.g., in a community forum) posed by users.

It may be inefficient to consider all candidate responders as being eligible for answering every question. For example, it may be desirable to select a set of candidate responders who have relevant expertise. A CRM system can store data or information for a wide variety of data such as previous questions asked by a user, answers to those questions and who responded to those questions, a candidate responder's skill set as specified by the candidate responder, user feedback for answers provided by the candidate responder, etc. In this example, a search query using keywords from the question may be submitted to the CRM system to extract answers that are relevant to the question and fetch the corresponding authors of the answers as candidate responders. A search of the CRM system may accordingly limit computations and provide better scalability in the situation where numerous questions are posed by users.

In response to a question posed by a user, it may be useful to analyze the question and match the question with a set of candidate responders who are likely to provide a high-quality answer to the question. It may be problematic to rely solely on data provided by candidate responders. For example, a candidate responder may specify a set of skills that she possesses, but the specified set of skills may not be an accurate portrayal of the knowledge possessed by the candidate responder. Additionally, it may be helpful to supplement this information with candidate responders who have not authored relevant posts but have metadata on their profiles that may suggest their relevance to the question.

The present disclosure provides techniques for using structured and unstructured information for providing a set of candidate responders having a greater probability of providing a high-quality response than other candidate responders. Structured information may refer to fields that are provided without inference and are readily available (e.g., provided by the candidate responder, a timestamp of a conversation, etc.), and unstructured information may refer to a feature that is extracted and transformed into an inference that the CRM system may use to match the question with a set of candidate responders who may be best suited for answering the question. It may be desirable to derive context and relevance using unstructured information from many different sources of information such as chat transcripts, emails, and case body text. By leveraging information on cases resolved previously by various candidate responders, a new question may be matched and routed to the best available candidate responder. A question may be considered routed to a candidate responder if the candidate responder is requested to and/or answers the question. Aspects of the disclosure may provide benefits such as reducing the mean time for resolving an input question and improving question/answer resolution quality.

Figure 3:
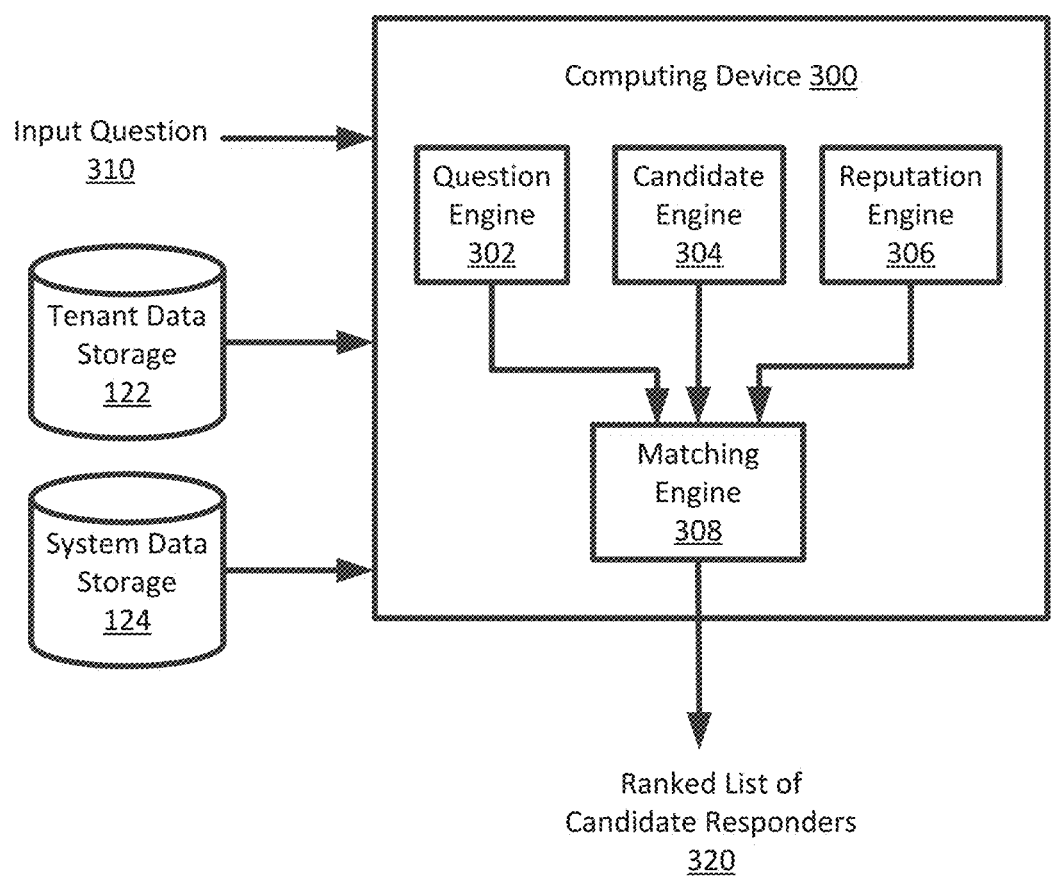
FIG. 3 illustrates a computing device for generating a ranked list of candidate responders according to some embodiments.

FIG. 3 illustrates a computing device 300 for generating a ranked list of candidate responders 320 according to some embodiments. In FIG. 3, computing device 300 includes a question engine 302, a candidate engine 304, a reputation engine 306, and a matching engine 308. A user may desire an answer to a question, which may be referred to herein as an input question 310 that includes text input from a user. Question engine 302 takes as data input the input question 310 and data stored in a database (e.g., tenant data storage 122 and/or system data storage 124). In an example, the user posts the input question 310 to an online community forum supported by a website (e.g., see FIGS. 7A-7C) or includes the input question 310 in an e-mail that is sent to the system. Input question 310 may include a title and a body and may contain several hundred words including both the title and the body. In another example, the user enters the input question 310 into a live chat session (see. FIG. 6). Question engine 302 extracts, based on the data input, structured and unstructured information. The structured information may include a set of attributes of the input question 310 (e.g., text of the question, a timestamp of when the question was posed, etc.), and unstructured information may include an inference of a skill set that would be helpful for a candidate responder to have in order to successfully answer the question.

Candidate engine 304 takes as input data that is associated with a candidate responder and stored in a database (e.g., tenant data storage 122 and/or system data storage 124) and extracts, based on the input, structured and unstructured information. The structured information for a candidate responder may include metadata profile information provided by the candidate responder. In an example, the metadata profile information includes a skill set and skill level specified by the candidate responder in a profile, a physical location of the candidate responder, and/or the candidate responder's interests and background. A candidate responder may provide a profile in which the candidate responder lists her skill set (e.g., highly skilled in the JAVA® programming language, etc.) and other information about herself. Additionally, the structured information may include how long the candidate responder has answered questions from users (e.g., for a particular forum, worked as an agent, etc.), the questions previously answered by the candidate responder and their associated answers, etc. The unstructured information for a candidate responder may include an inference of a skill set possessed by the candidate responder. The skill set may be based on questions previously answered by the candidate responder and the answers provided by the candidate responder. Although unstructured information may be more difficult for the computing device 300 to process and understand than structured information, it may be desirable to transform unstructured information into data that is useful when identifying candidate responders who would be most helpful in answering questions posed by users.

An engine (e.g., question engine 302 and candidate engine 304) may infer information by analyzing text from applicable case fields and training a model to extract words or phrases that represent the inferred information. The extracted features may be included in a feature vector for comparison with other objects. A feature may be extracted using a variety of techniques such as natural language processing (NLP). In an example, the engine uses a classification technique that uses existing training data for determining the inferred information (e.g., an intent of a question, a skill set that would be helpful for a candidate responder to have to successfully answer the question, or a skill set of the candidate responder) in a supervised or semi-supervised classification.

In another example, the engine uses an extraction technique that in a cold-start situation extracts skills in an unsupervised fashion using NLP techniques such as topic modeling and entity extraction. In topic modeling, a topic model such as Latent Dirichlet allocation (LDA) can be applied to a candidate responder's previous answers. A topic-word probability is used to obtain a score associated with the input question for each candidate responder for ranking, as will be explained further below. It may be desirable for the engine to compute topics for questions or candidate responders periodically because the topics may change as new posts are generated and up-to-date topics are helpful in selecting the appropriate candidate responders. In an example, an engineering process runs constantly and keeps the topic information and/or inferred skill set information current. The engineering process may be included in or separate from the engine.

In another example, the engine performs word embedding and/or character embedding to generate an embedding for each word and/or character in an unstructured text input sequence. Each text input includes a sequence of words, and each embedding can be a vector. In some embodiments, these can be word embeddings, such as obtained, for example, by running methods like word2vec, FastText, or GloVe, each of which defines a way of learning word vectors with useful properties. In some embodiments, the embedding may include partial word embeddings related to portions of a word. For example, the word "where" includes portions "wh," "whe," "her," "ere," and "re." Partial word embeddings can help to enrich word vectors with subword information/FastText. In some embodiments, the embeddings may include character embeddings, e.g., from a social media website. In an example, the engine computes vector representations for each word/character in the case/document and averages it out. In another example, the engine uses neural networks to learn the embedding for a document.

The engine may receive the embeddings and generate encodings based on the embeddings. The engine may include an encoder that learns high-level features from the words of text input sequences, and generates encodings (e.g., vectors) which map the words in the text input sequence to a higher dimensional space. The encodings may encode the semantic relationship between words. In some embodiments, the encoder is implemented with a recurrent neural network (RNN). In some embodiments, the encoder can be implemented with one or more gated recurrent units (GRUs). Various types of encoders may be used, including for example, a bidirectional long-term short-term memory (Bi-LSTM) encoder. In an example, the engine generates a feature vector representing elements in the form of a floating point vector of k dimensions. If other structured fields for cases are available, they may also be obtained and converted into a feature vector. The engine may also use bag-of-words modeling or term frequency-inverse document frequency (TF-IDF) for feature extraction.

Reputation engine 306 computes a reputation score that reflects candidate responders' reputations in the CRM system. A reputation score provides an incentive for candidate responders to provide high-quality answers and service. For example, in order to maintain a high reputation score, a candidate responder may be more thorough in her response to a question, may minimize the time delay in responding to the question, and may want to ensure that the user is happy with and understands the response to the question.

Given a set of features f, the reputation engine 306 applies a linear model with a learned set of weights w to compute the reputation score for a candidate responder as follows:

$$\Sigma_{i=0}^{|f|} \omega_i * f_i.$$

The weights w can be provided by the domain experts or can be learned in a training process, where previously posed questions and their answers tune the influence of each feature.

Given the input question 302 and information provided by question engine 302, candidate engine 304, and/or reputation engine 306, matching engine 308 matches the input question with candidate responders who have some relevance to the question and have a high probability of providing a high-quality answer to the input question. In some examples, matching model 308 computes a probability score representing a prediction of the quality of an answer that would be provided by the respective candidate responder to the input question if the input question were routed to the respective candidate responder. In this way, the "right" candidate responder may be selected for answering an incoming question.

Figure 4:
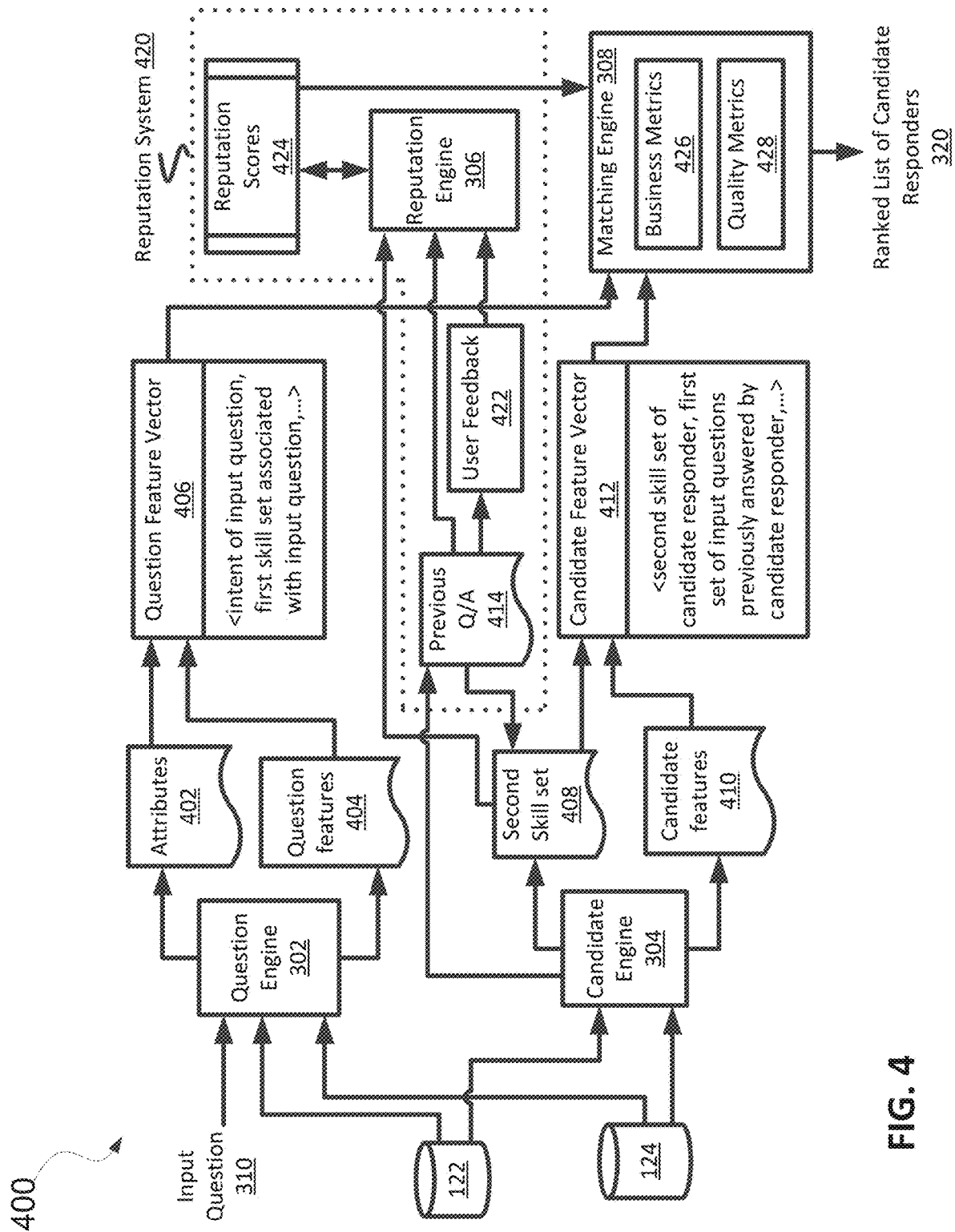
FIG. 4 illustrates a diagram of a process flow for generating a ranked list of candidate responders according to some embodiments.

As further explained below with reference to FIG. 4, the probability score is based on information processed by the question engine 302, the candidate engine 304, and the reputation engine 306. FIG. 4 illustrates a diagram 400 of a process flow for generating a ranked list of candidate responders according to some embodiments. In the example illustrated in FIG. 4, the question engine 302 takes the input question 310 and data stored in tenant data storage 122 and/or system data storage 124 as input data and extracts, based on the input data, attributes 402 and question features 404. In an example, the input question 310 is "My modem model DPC123 v1 is broken. How do I fix it?" In this example, attributes 402 may include the text input from the user who posed the input question 310. Additionally, question features 404 may include a description of the input question (e.g., fix modem), a summary of the input question (e.g., "modem broken and fix"), and particular keywords that have been identified as important to retrieving a correct answer, such as "modem," "model DPC123 v1," "broken," and "fix."

Question engine 302 generates a question feature vector 406 representing an intent of the input question 310 and a first skill set inferred from the input question 310. Question engine 302 identifies the first skill set as being helpful for a candidate responder to possess in order to successfully answer the input question 302. Question feature vector 406 may also represent additional elements as discussed in the present disclosure. Question engine 302 may infer an intent of the input question 310 and/or the first skill set based on the attributes 402 and/or question features 404 using various techniques discussed in the present disclosure (e.g., NLP techniques). Using the above example, question engine 302 infers that the user is requesting information on how to fix the specified modem. Additionally, question engine 302 may recognize that a "modem" is a networking device and accordingly infer that networking skills associated with modems may be an important skill for a candidate responder to possess in order to answer the question accurately.

Candidate engine 304 takes data stored in tenant data storage 122 and/or system data storage 124 as input data and determines, based on the input data, a second skill set 408 of a candidate responder and candidate features 410. The input data may include, for example, previous questions/answers (Q/A) 414 associated with a candidate responder, metadata information for candidate responders, pre-computed topic models for building profiles, etc. The candidate responder may provide the profile and specify information about herself (e.g., her skill set and skill levels, areas of expertise, certifications, degrees and from which schools, etc.). A previous Q/A is associated with a candidate responder if the candidate responder provided an answer to the question. Previous Q/A 414 includes questions previously answered by the candidate responder and their corresponding answers (e.g., livechat transcripts, posts, comments, or conversations in which the candidate responder participated).

For one or more candidate responders, candidate engine 304 generates a candidate feature vector 412 representing the second skill set 408 of the respective candidate responder and a first set of input questions previously answered by the respective candidate responder. The first set of input questions may be a subset of previous Q/A 414. The second skill set 408 may be based on structured and unstructured information. Candidate engine 304 may infer the second skill set 408 of a candidate responder by analyzing text from the candidate responder fields and training a model to extract words or phrases that represent skills. In an example, the second skill set 408 is derived from the respective candidate responder's profile, a set of input questions previously answered by the respective candidate responder, and/or an answer to at least one of the set of input questions.

The candidate engine 304 identifies the important keywords so that not every word used by the candidate responder is represented. Candidate engine 304 may use NLP techniques to construct the candidate feature vector 412. In an example, the candidate feature vector 412 is a numeric vector where the weight of a particular term is related to how often the candidate responder has used that term in her own answers. For example, if the candidate responder has over a threshold number of posts about JAVA®, the weight of the term JAVA® in that vector may be high.

Candidate feature vector 412 may also represent additional elements as discussed in the present disclosure. In some examples, the candidate feature vector 412 represents metadata profile information, answers provided by the candidate responder to questions, inferred topics derived from a candidate responder's posts (e.g., topic models), self-tagged topics, expertise level, and/or managed and edited topics. In some examples, the candidate feature vector 412 represents a candidate responder's activity information, which may be stored in tenant data storage 122 and/or system data storage 124. A candidate responder's activity information may include the candidate responder's lag time in responding to questions (e.g., average lag time), posting activity and frequency, feedback frequency, login activity, timestamps of the activity, etc.

While considering a candidate responder's past posts, it may be desirable to view them at different granularities in order to select the appropriate candidate responders. For example, while some candidate responders may have only one post, some candidate responders may have a large number of posts about different topics, which may contribute to noise. Accordingly, it may be challenging to compare candidate responders across these different distributions. To overcome this problem, candidate engine 304 may limit the number of posts or input questions from which the candidate feature vector 412 is based to past N posts by the candidate responder, where N is a number greater than one (e.g., five or ten). In this way, the candidate engine 304 may capture a candidate responder's recent interests. In this example, the candidate feature vector 412 represents NLP features from the candidate responder's last N posts using, for example, NLP-grams, TF-IDF, or embeddings.

FIG. 4 also includes a reputation system 420 including a reputation engine 306 that receives the second skill set 408, previous Q/A 414, and/or user feedback 422 as input data. For each of one or more candidate responders, the reputation engine 306 computes a reputation score 424 based on a second set of input questions previously answered by the respective candidate responder and user feedback for the respective candidate responder. A reputation score may be based on other values such as user feedback regarding one or more answers previously provided by a candidate responder to one or more questions. The second set of input questions is a subset of previous Q/A 414. The second skill set 408 and previous Q/A 414 were discussed above.

User feedback 422 may provide signals regarding the quality of a responder's previous answers. The reputation score may be based in part on the user feedback 422, which may indicate a quality of one or more answers previously provided by a candidate responder to one or more questions. Reputation engine 306 may receive user feedback 422 in a variety of ways. In an example, the reputation engine 306 receives a "best answer" user input, which allows private users to provide feedback on who provided the best answer to a question. In another example, the reputation engine 306 provides user-selectable options (e.g., buttons or links) that allow users to express their agreement or disagreement with an answer. For example, a first user-selectable option that when selected may indicate that a user likes the answer, a second user-selectable option that when selected may indicate that a user has shared the answer with another user, a third user-selectable option that when selected may indicate that a user believes that the responder correctly answered the question, and/or a fourth user-selectable option that when selected may indicate that a user has reposted the answer. User feedback 422 may include one or more of these user feedback options. In the absence of explicit feedback methods, feedback can also be inferred by analyzing the user's response to the answer. For example, the sentiment of the final response by the user can indicate how satisfied she is with the answer given by the responder (e.g., agent or expert). Reputation engine 306 may receive an indication that a user has selected a particular user-selectable option that when selected provides the user feedback to the system.

Reputation engine 306 may provide different weights to different user feedback options. For example, the reputation engine 306 may provide more weight to the "best answer" option because a selected few may provide this type of user feedback compared to the first, second, third, and/or fourth user-selectable options. Additionally, reputation engine 306 may desire to give higher preferences to candidate responders who are active posters as they are the ones more likely to answer questions. Data stored in tenant data storage 122 and/or system data storage 124 may include information such as previous Q/A and their associated responders, frequency of posts, timestamps of answers provided, and/or user feedback 422.

In an example, reputation engine 306 is trained by constructing a dataset for learning the probability of obtaining a "best answer" for a question posed by a user. Reputation engine 306 may use a logistic regression model that uses features from the candidate features 410 and/or the question features 404. Reputation engine 306 may estimate the marginal probability of obtaining a "best answer" from a given candidate responder by aggregating all the probabilities of users obtaining "best answers" for the questions that are generated by the logistic model. Reputation engine 306 may normalize these marginal probabilities and use these probabilities as reputation scores for the candidate responders.

Matching engine 308 computes, based on the question feature vector 406 and further based on the candidate feature vector 412 and the reputation score 424 associated with a candidate responder, a probability score representing a prediction of the quality of an answer that would be provided by the respective candidate responder to the input question if the input question were routed to the respective candidate responder. Matching engine 308 generates a ranked list of candidate responders 320 using the computed probability scores. In an example, matching engine 308 ranks the various candidate responders for a given question using the applicable question feature vector 406, candidate feature vector 412, and reputation scores 424, applying machine learning techniques to perform the ranking, and selecting the top K candidate responders for the input question, where K is a number greater than one.

The matching engine 308 may use a collaborative filtering technique to rank the list of candidate responders based on past cases resolved by the particular candidate responder. Using the collaborative filtering technique, the matching engine 308 may find a candidate responder who is the best match for the case. Additionally, the matching engine 308 may use a variety of factors for matching the input question 310 with the best candidate responder(s). In an example, the matching engine 308 determines how relevant the input question 310 is to previous questions answered by candidate responders. In another example, the matching engine 308 estimates a probability of a candidate responder answering the input question 310.

In the example illustrated in FIG. 4, matching engine 308 maintains business metrics 426 and quality metrics 428 and may store this information in tenant data storage 122 and/or system data storage 124. In an example, business metrics 426 includes information such as a percentage of unanswered input questions that will be answered correctly (best answer) by the recommended candidate responder or a quantity of candidate responders with their profiles enabled. In an example, quality metrics 428 includes information such as a mean percentage of time the CRM system recommends at least one right knowledgeable candidate responder in the ranked list candidate responders 320, a mean percentage of time the unanswered questions are correctly answered by the recommended candidate responders, or a mean time to answer a question by the recommended candidate responder.

Figure 5:
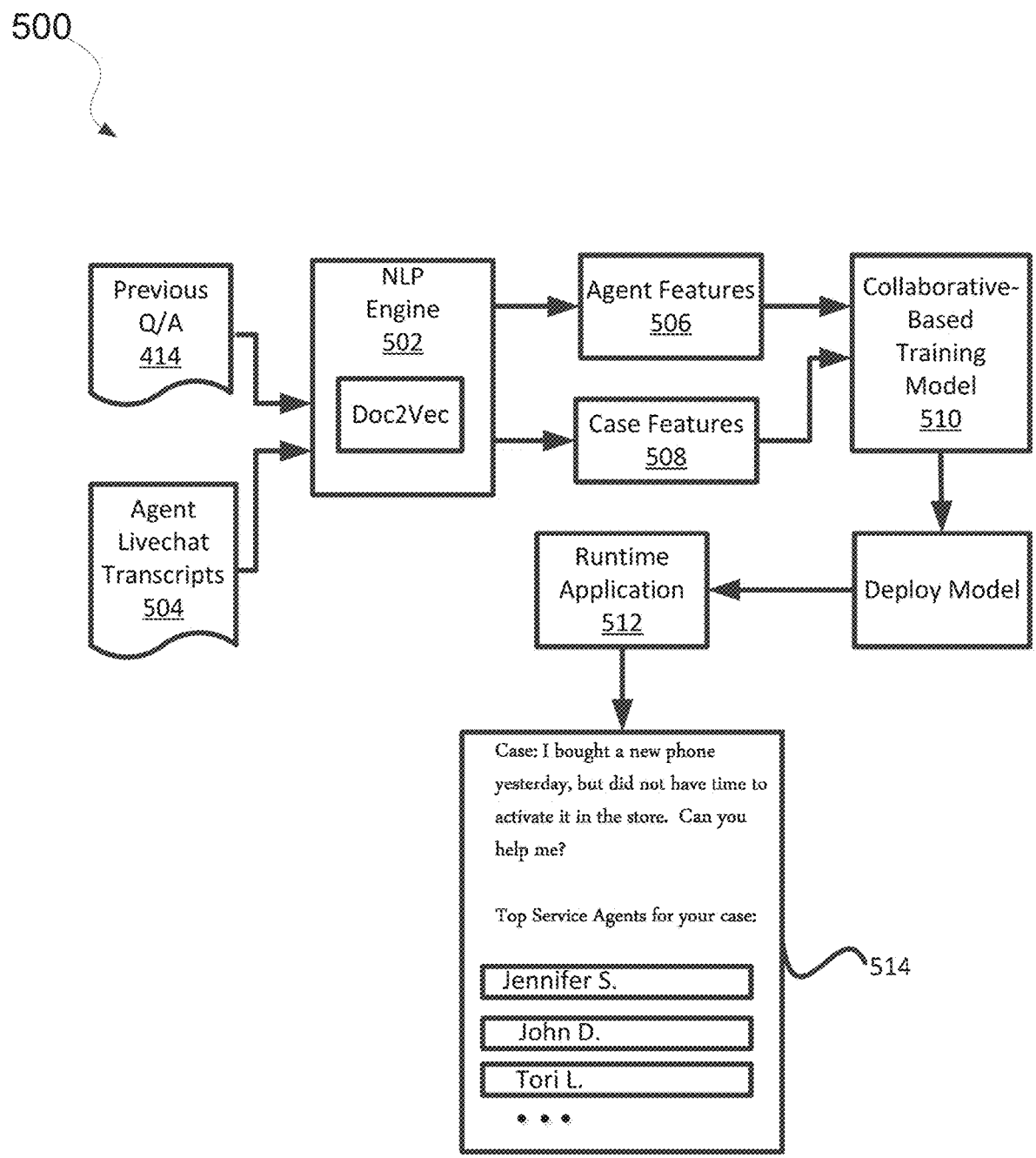
FIG. 5 illustrates a diagram of a process flow for generating a ranked list of agents according to some embodiments.

FIG. 5 illustrates a diagram 500 of a process flow for generating a ranked list of agents according to some embodiments. In FIG. 5, the case is "I bought a new phone yesterday, but did not have time to activate it in the store. Can you help me?" An NLP engine 502 processes previous Q/A 414 and agent live transcripts 504, which may be stored in tenant data storage 122 and/or system data storage 124, and applies NLP techniques (e.g., Doc2Vec) on the previous Q/A 414 and agent live transcripts 505 to generate agent features 506 and case features 508. Agent live transcripts 504 include transcripts of previous conversations between users and candidate responders. Agent features 506 and case features 508 may be used as input into a collaborative-based training model 510, which may be deployed on a runtime application 512. Runtime application 512 provides a ranked list of agents 514 for responding to the case. The first agent listed in the ranked list of agents 514 is Jennifer S., the second agent listed in the ranked list of agents 514 is John D., the third agent listed in the ranked list of agents 514 is Tori L., and so on.

FIG. 6 illustrates an example LiveAgent transcript 602, which includes the case discussed in FIG. 5. In FIG. 6, Jennifer S. is part of the "Shop and Support" team and helps the user. With reference to FIGS. 5 and 6, the collaborative-based training model 510 may ascertain that the user needs help to activate her cellphone and accordingly identifies the best agents that are within the "Shop and Support" team to help the user activate her phone.

Figure 7A:
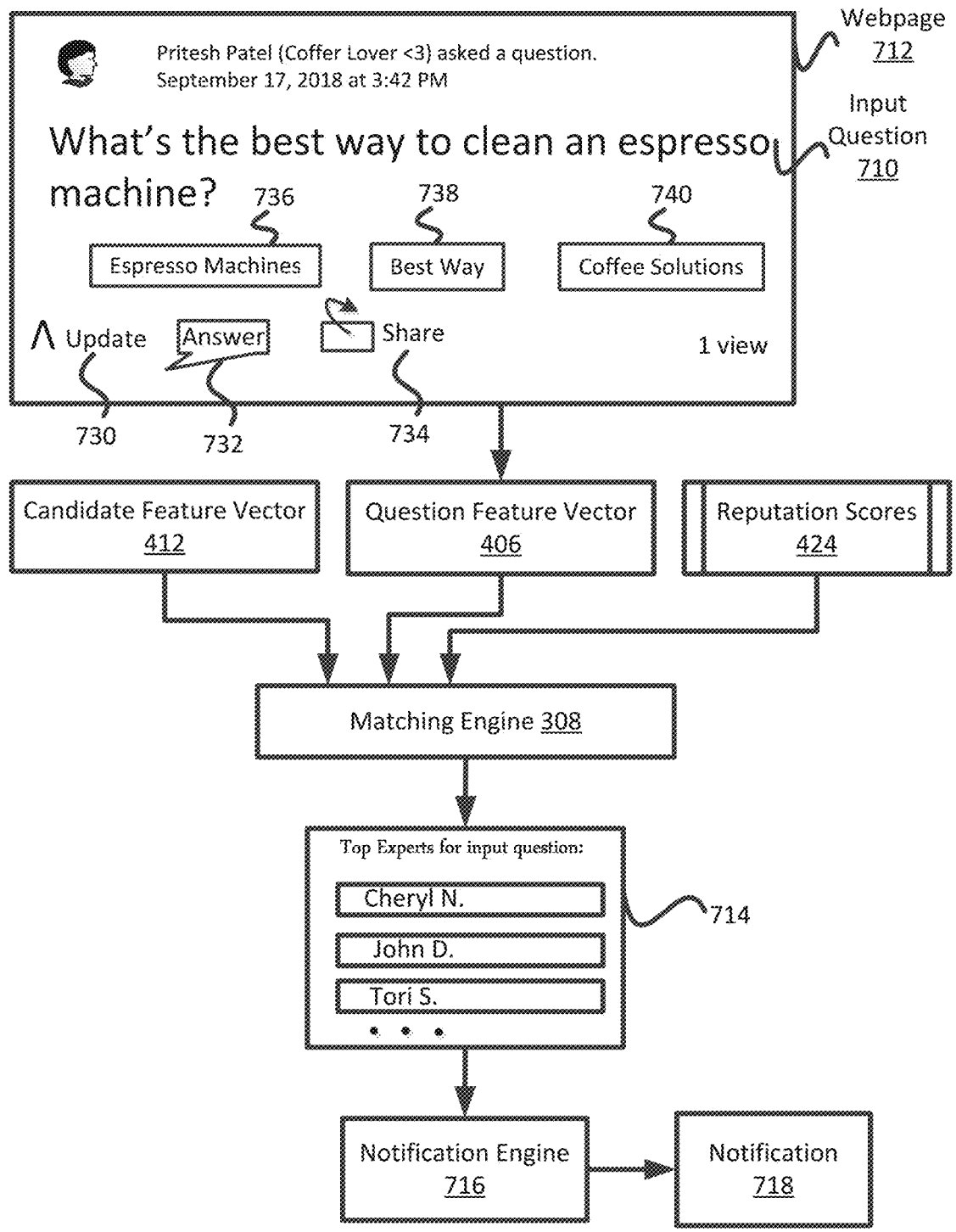
FIGS. 7A-7C illustrate a flow for sending a notification to an expert according to some embodiments.
Figure 7B:
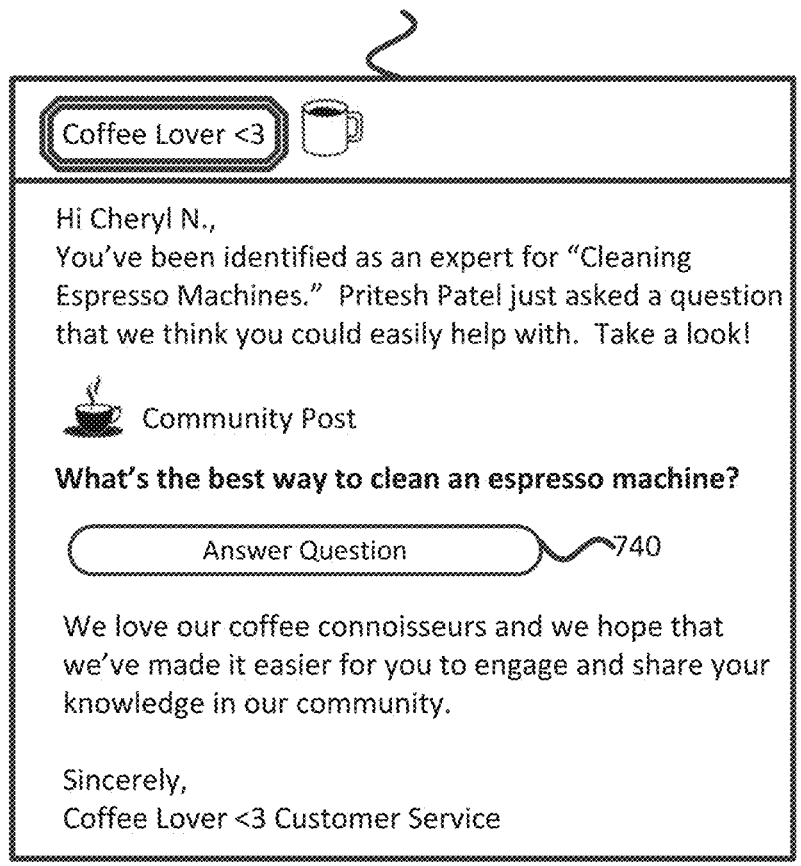
Figure 7C:

FIGS. 7A-7C illustrate a flow for sending a notification 718 to an expert according to some embodiments. In FIG. 7A, a user posts an input question 710 on a webpage 712 associated with a community forum. The input question 710 is a user-submitted question to a coffee community and includes the following text input: "What's the best way to clean an espresso machine?" Webpage 712 includes a first user-selectable option 730 for updating the post, a second user-selectable option 732 for posting an answer to the question, and a third user-selectable option 734 for sharing the post. Additionally, the post has been viewed one time and has a timestamp of Sep. 17, 2107 at 3:42 PM. The question feature vector 406 may extract the keywords "Espresso Machine" 736, "Best Way" 738, and "Coffee Solutions" 740 from the input question 710 and display the keywords 736, 738, and 740 on the webpage 712.

The input question 710 is provided as input and influences the question feature vector 406. The matching engine 308 receives and analyzes the question feature vector 406 and the candidate feature vector 412 and reputation scores 424 associated with a candidate responder. The matching engine 308 computes, based on the question feature vector 406 and further based on the candidate feature vector 412 and the reputation score associated with a particular candidate responder, a probability score representing a prediction of the quality of an answer that would be provided by the respective candidate responder to the input question 710 if the input question were answered by the respective candidate responder. The matching engine 308 generates a ranked list of experts 714 using the computed probability scores. The user may post the question 710 and wait for a response, which is not guaranteed. It may be desirable for a notification engine 716 to send a notification 718 to a listed expert, the notification indicating that a question within the expert's expertise has been asked by a user.

FIG. 7B provides an example notification 718 according to some embodiments. In FIG. 7B, the notification 718 is sent to Cheryl N., the first expert listed in ranked list of experts 714. Notification 718 may be provided via a webpage including a user-selectable option 740 that when selected allows the expert to respond to the question. In response to selection of user-selectable option 740, the expert may be steered to a webpage 750 shown in FIG. 7C. Webpage 750 includes the original post along with an input field 752 where the expert may provide her answer to the question. After completing her response, the expert may select a user-selectable option 754 that when selected provides the answer to the user.

Referring back to FIG. 7A, matching engine 308 and notification engine 716 may communicate with each other and pass information back and forth. For example, the notification engine 716 may receive the ranked list of experts 714 from the matching engine 308, and return feedback on expert activity to the matching engine 308. It may be desirable to rely on the rank of an expert for choosing to which experts to send notifications. Notification engine 716 may start by sending notifications to the top-ranked experts.

In an example, notification engine 716 sends, based on a schedule, one or more notifications 718 to users who have been selected as experts and subsequently gathers feedback on how the experts responded to the notification(s). Notification engine 716 may be configuration-driven and schedule notifications 718 to be sent out in a default setting allowing administrators to configure parameters. In an example, configurable parameters include a frequency of notification emails, a wait time for choosing the next expert, a number of questions per expert, a feedback loop (e.g., for recording user engagement), and/or business logic for diversity of selection. In an example, notification engine 716 sends a notification of an input question to the first listed candidate responder in the ranked list of candidate responders. If the notification engine 716 determines that a time period has elapsed before the first candidate responder has responded to the input question, the notification engine 716 may send the notification to the second listed candidate responder in the ranked list of candidate responders Additionally, notification engine 716 may include business logic that handles diversity of experts. The business logic may ensure that the same expert is not always chosen. In an example, the notification engine 716 may implement a round robin technique to ensure that different experts are selected and sent notifications 718. It may be annoying for an expert to be bombarded with notifications on many questions. In an example, notification engine 716 sets a limit for an expert being selected for receiving a notification. Notification engine 716 may also determine how long to wait for a particular expert to answer a question before moving onto another expert.

Notification engine 716 may also collect feedback from the experts and/or users to report answers. For example, notification engine 716 may request an expert to provide feedback on whether the question for which the expert was notified is within the expert's expertise. In another example, notification engine 716 may request a user to provide feedback on whether she was satisfied with the answers provided.

Notification engine 716 may store expert answers (the text within input field 752 in FIG. 7C) and the frequency of responses in the CRM database for further analysis and optimization. In an example, notification engine 716 keeps track of when experts respond to notifications and answer questions and how many notifications were sent to an expert before the expert provided a response to the question. If particular users do not respond, notification engine 716 may send notifications to the other users listed on the ranked list of experts 714. Notification engine 716 determines and sets a suitable duration for sending notifications and waiting for responses. Additionally, notification engine 716 may provide incentives for experts who respond to questions. The incentives may be a set of configurable parameters that can be customized. In an example, notification engine 716 may provide an expert with a coupon for a free cup of coffee after answering a threshold number of questions.

Operational Flow

Figure 8:
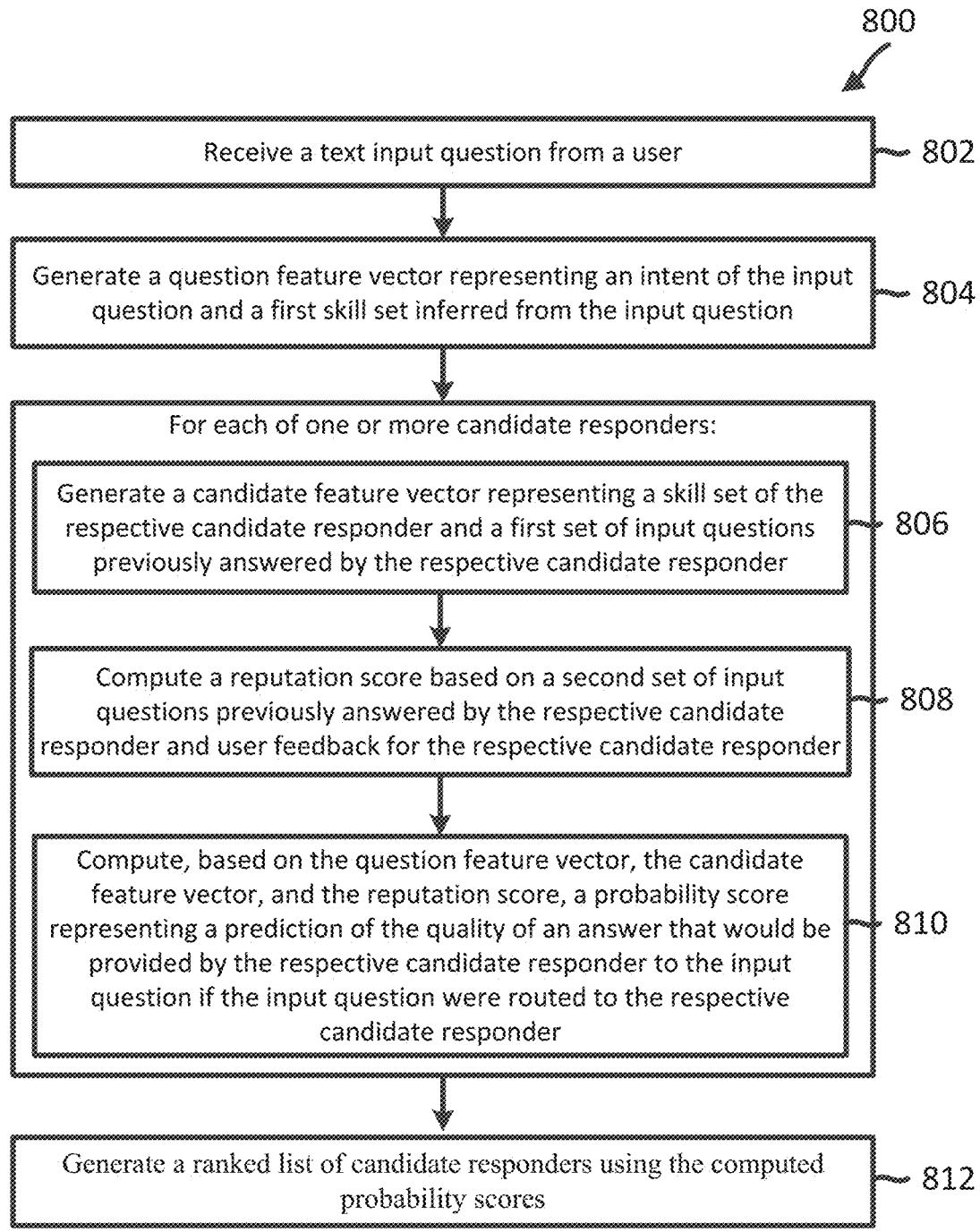
FIG. 8 is a flowchart of a method for generating a ranked list of candidate responders according to some embodiments.

FIG. 8 is a flowchart of a method 800 for generating a ranked list of candidate responders according to some embodiments. One or more of the processes 802-812 of the method 800 may be implemented, at least in part, in the form of executable code stored on non-transitory, tangible, machine-readable media that when run by one or more processors may cause the one or more processors to perform one or more of the processes 802-812. In some embodiments, method 800 can be performed by one or more computing devices in systems or diagrams 100, 200, 300, 400, 500, and 700 of FIGS. 1, 2, 3, 4, 5, and 7, respectively, including the question engine 302, the candidate engine 304, the reputation engine 306, the matching engine 308, and/or the notification engine 716. Aspects of the processes 802-812 of method 800 have been covered in the description for FIGS. 1, 2, 3, 4, 5, and 7; and additional aspects are provided below.

At a process 802, a computing device (e.g., via question engine 302) receives a text input question from a user. Various users interacting with a system, such as a CRM system, may have questions for which they need help or a response. At a process 804, the computing device (e.g., via question engine 302) generates a question feature vector representing an intent of the input question and a first skill set inferred from the input question.

For each of one or more candidate responders, the computing device may perform the processes 806, 808, and 810. At a process 806, the computing device (e.g., via candidate engine 304) generates a candidate feature vector representing a skill set of the respective candidate responder and a first set of input questions previously answered by the respective candidate responder. At a process 808, the computing device (e.g., via reputation engine 306) computes a reputation score based on a second set of input questions previously answered by the respective candidate responder and user feedback for the respective candidate responder. At a process 810, the computing device (e.g., via matching engine 308) computes, based on the question feature vector, the respective candidate feature vector, and the reputation score, a probability score representing a prediction of the quality of an answer that would be provided by the respective candidate responder to the input question if the input question were routed to the respective candidate responder. At a process 812, the computing device (e.g., via matching engine 308) generates a ranked list of candidate responders using the computed probability scores.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Unless specifically stated otherwise as apparent from the following discussion, it is appreciated that throughout the description, discussions utilizing terms such as "determining," "computing," "generating," "comparing," "selecting," "identifying," "receiving," "collecting," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modifications, changes and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A computing device comprising:
    a memory containing machine readable medium storing machine executable code; and
    one or more processors coupled to the memory and configurable to execute the machine executable code to cause the one or more processors to:
    receive a text input question from a user;
    generate a question feature vector representing an intent of the input question and a first skill set inferred from the input question;
    for each of one or more candidate responders:
        generate a candidate feature vector representing a skill set of the respective candidate responder, a first set of input questions previously answered by the respective candidate responder, and metadata profile information provided by the respective candidate responder, the metadata profile information including one or more candidate skill sets and one or more candidate skill levels corresponding to the one or more candidate skill sets;
        compute a reputation score based on a second set of input questions previously answered by the respective candidate responder and user feedback for the respective candidate responder using a set of weights, wherein the weights are provided by domain experts or are learned in a training process; and
        compute, based on the question feature vector, the candidate feature vector, and the reputation score, a probability score representing a prediction of a quality of an answer that would be provided by the respective candidate responder to the input question if the input question were routed to the respective candidate responder; and
    generate a ranked list of candidate responders using the probability score.

2. The computing device of claim 1, wherein the question feature vector represents a topic of the input question.

3. The computing device of claim 1, wherein the candidate feature vector represents inferred topics derived from a candidate responder's posts.

4. The computing device of claim 1, wherein the machine executable code further causes the one or more processors to:
    for each of one or more candidate responders, collect activity information for the respective candidate responder, wherein the probability score is computed based on the activity information.

5. The computing device of claim 4, wherein the activity information includes at least one of the candidate responder's average lag time in responding to a set of questions, posting activity and frequency, or login activity.

6. The computing device of claim 1, wherein the skill set of the respective candidate responder is derived from the respective candidate responder's profile and an answer to at least one of the first set of input questions.

7. The computing device of claim 1, wherein the machine executable code further causes the one or more processors to:
receive user feedback indicating a quality of one or more answers previously provided by a candidate responder to one or more questions, wherein the reputation score is based on the user feedback.

8. The computing device of claim 7, wherein the machine executable code further causes the one or more processors to:
receive an indication that a user has selected a user-selectable option that when selected provides the user feedback.

9. The computing device of claim 1, wherein the machine executable code further causes the one or more processors to:
send a notification of the input question to the first listed candidate responder in the ranked list of candidate responders.

10. The computing device of claim 9, wherein the machine executable code further causes the one or more processors to:
identify a schedule for sending notifications to candidate responders, wherein the notification is sent in accordance with the schedule.

11. The computing device of claim 9, wherein the machine executable code further causes the one or more processors to:
determine that a time period has elapsed before the first candidate responder has responded to the input question; and
in response to a determination that the time period has elapsed, send the notification to the second listed candidate responder in the ranked list of candidate responders.

12. A method performed by one or more processors executing machine executable code, the method comprising:
receiving a text input question from a user;
generating a question feature vector representing an intent of the input question and a first skill set inferred from the input question;
for each of one or more candidate responders:
generating a candidate feature vector representing a skill set of the respective candidate responder, a first set of input questions previously answered by the respective candidate responder, and metadata profile information provided by the respective candidate responder, the metadata profile information including one or more candidate skill sets and one or more candidate skill levels corresponding to the one or more candidate skill sets;
computing a reputation score based on a second set of input questions previously answered by the respective candidate responder and user feedback for the respective candidate responder using a set of weights, wherein the weights are provided by domain experts or are learned in a training process; and
computing, based on the question feature vector, the candidate feature vector, and the reputation score, a probability score representing a prediction of a quality of an answer that would be provided by the respective candidate responder to the input question if the input question were routed to the respective candidate responder; and
generating a ranked list of candidate responders using the probability score.

13. The method of claim 12, wherein the candidate feature vector represents an answer to at least one question of the first set of questions.

14. The method of claim 12, wherein a reputation score is further based on an answer to at least one question of the second set of questions.

15. The method of claim 12, further comprising:
receiving user feedback indicating a quality of one or more answers previously provided by a candidate responder to one or more questions, wherein the reputation score is based on the user feedback.

16. The method of claim 12, further comprising:
sending a notification of the input question to the first listed candidate responder in the ranked list of candidate responders.

17. The method of claim 16, wherein the notification includes an incentive for the first listed candidate responder to respond to the input question.

18. A non-transitory machine-readable medium comprising executable code which when executed by one or more processors associated with a computing device are adapted to cause the one or more processors to perform a method comprising:
receiving a text input question from a user;
generating a question feature vector representing an intent of the input question and a first skill set inferred from the input question;
for each of one or more candidate responders:
generating a candidate feature vector representing a skill set of the respective candidate responder, a first set of input questions previously answered by the respective candidate responder, and metadata profile information provided by the respective candidate responder, the metadata profile information including one or more candidate skill sets and one or more candidate skill levels corresponding to the one or more candidate skill sets;
computing a reputation score based on a second set of input questions previously answered by the respective candidate responder and user feedback for the respective candidate responder using a set of weights, wherein the weights are provided by domain experts or are learned in a training process; and
computing, based on the question feature vector, the candidate feature vector, and the reputation score, a probability score representing a prediction of a quality of an answer that would be provided by the respective candidate responder to the input question if the input question were routed to the respective candidate responder; and
generating a ranked list of candidate responders using the probability score.

19. The non-transitory machine-readable medium of claim 18, wherein the method further comprises:
receiving user feedback indicating a quality of one or more answers previously provided by a candidate responder to one or more questions, wherein the reputation score is based on the user feedback.

20. The non-transitory machine-readable medium of claim 18, wherein the method further comprises:
sending a notification of the input question to the first listed candidate responder in the ranked list of candidate responders.

* * * * *